April 5, 1932.   S. L. CAPLE   1,852,504
PORTABLE DUMP BOX AND LOADER
Filed Sept. 12, 1930   2 Sheets-Sheet 1
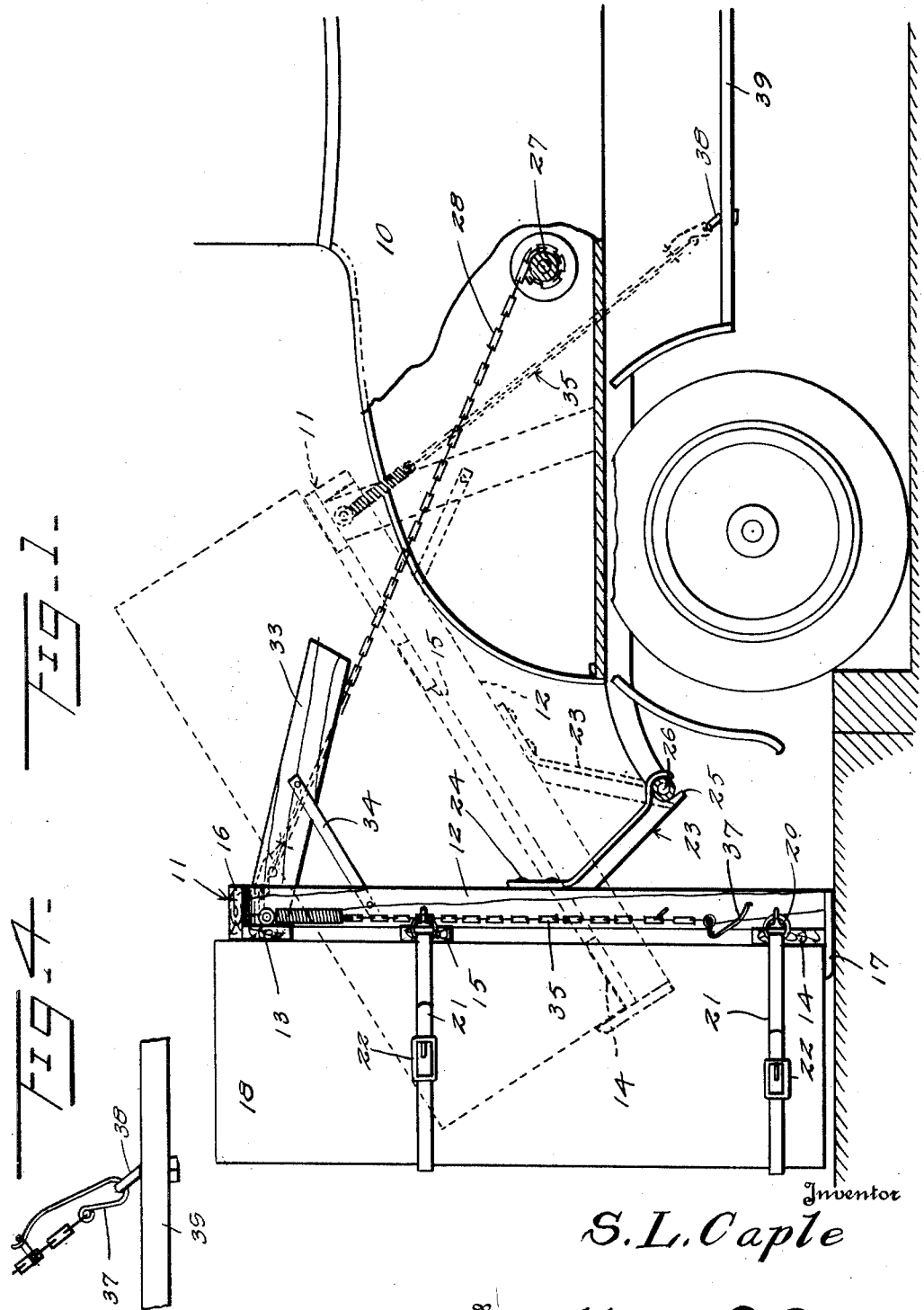
Inventor
S. L. Caple
By Watson E. Coleman
Attorney

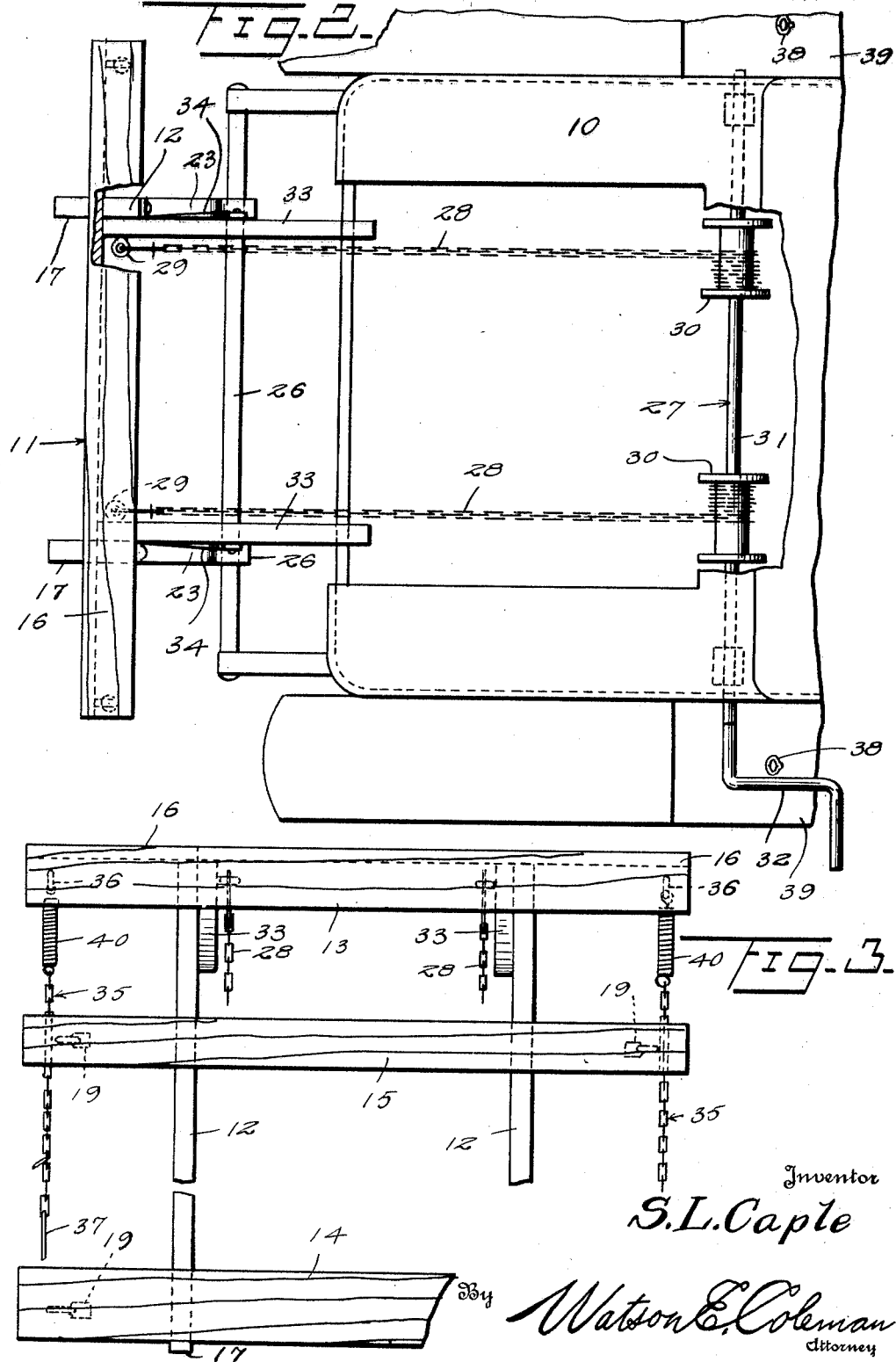
April 5, 1932.   S. L. CAPLE   1,852,504
PORTABLE DUMP BOX AND LOADER
Filed Sept. 12, 1930   2 Sheets-Sheet 2
Inventor
S. L. Caple
By Watson E. Coleman
Attorney Patented Apr. 5, 1932

1,852,504

UNITED STATES PATENT OFFICE

SHERMAN L. CAPLE, OF SHERIDAN, WYOMING

PORTABLE DUMP BOX AND LOADER

Application filed September 12, 1930. Serial No. 481,567.

The present invention relates to loading devices and more particularly to a portable loading device for loading boxes or articles on a motor vehicle.

An object of this invention is to provide a relatively simple carrier which may be removably attached to the rear end of a motor vehicle, the carrier being adapted to receive any desired article in the form of a box, piano, or the like.

Another object of this invention is to provide a carrier of this kind which is so constructed as to permit the transportation of a relatively heavy object by a motor vehicle and preferably a passenger vehicle, the carrier being so constructed as to permit the ready attachment and detachment of the carrier from the vehicle when the article is secured thereto.

A further object of this invention is to provide a carrier which will not interfere with the present parts of the motor vehicle and which may be removed from the vehicle in a relatively short space of time.

A still further object of this invention is to provide a carrier which includes cushioning means for cushioning the carrier on the body of the vehicle during the transportation thereof.

The above and various other objects and advantages of this invention will in part be described in and in part be understood from the following detailed description of the present preferred embodiment, the same being illustrated in the accompanying drawings, wherein:—

Figure 1 is a detail end elevation of a device constructed according to the preferred embodiment of this invention showing in solid lines the carrier having an article secured thereto, the carrier being shown in unloaded position, while the dotted lines show the carrier in mounted position on the rear end of a motor vehicle;

Figure 2 is a top plan view of the device in unloaded position;

Figure 3 is a fragmentary detail rear elevation of the device, and

Figure 4 is an enlarged fragmentary detail view showing the manner of securing the carrier to the running board of the motor vehicle.

Referring to the drawings wherein like numerals of reference designate corresponding parts throughout the several views, the numeral 10 designates generally a motor vehicle of the type having only one seat therein, such as the coupé or roadster type, and the numeral 11 designates generally a carrier or loader which is constructed according to the preferred embodiment of this invention, the carrier 11 comprising a loading frame having a pair of vertically disposed beams 12, an upper horizontal bar 13, a lower horizontal bar 14, and an intermediate bar 15, the intermediate bar 15 being positioned at the desired point intermediate the upper and lower bars 13 and 14, respectively.

A top bar 16 is secured to the upper ends of the supporting beams 12 and a plurality of outstanding supporting legs or feet 17 are secured to the upright members 12 and extend rearwardly therefrom.

The legs 17 being adapted to receive a package in the form of a box or the like, as shown at 18.

In order to secure the article 18 to the frame 11 there are provided a plurality of securing hooks 19 which are positioned on the intermediate bar 15, adjacent the opposite ends thereof, and in like manner a hook 19 is secured to the lower bar 14 adjacent the ends thereof, the hooks 19 being adapted to detachably receive a ring 20, which is secured to one end of a strap 21, the strap 21 being of conventional construction having a buckle 22 intermediate the ends thereof so that the strap may be readily tightened about the article 18.

In order to removably secure the frame 11 to the body of the motor vehicle 10, a pair of supporting legs, generally designated as 23, are secured to the front face of the upright members 12 and are downwardly inclined therefrom, the supporting legs 23 being constructed in the form of an angle bar and secured at one end to the upright bars 12 by means of bolts 24 or the like.

The free ends of the supporting legs 23 are preferably recessed, as at 25, so as to removably engage a transverse bar 26 secured to the frame of the vehicle 10. In practice, the transverse bar 26 comprises one of the frame members of the motor vehicle adjacent the rear end thereof.

A windlass generally designated as 27 is mounted in the body of the motor vehicle 10 at a point spaced forwardly from the rear end thereof, and a flexible member 28 in the form of a cable, chain, or the like is adapted to be wound about the windlass 27. One end of the flexible member 28 being attached to an eye bolt 29 carried by the upper ends of the upright members 12 of the frame 11.

The windlass 27 preferably is provided with a pair of winding drums 30 or the like, but I do not wish to be limited to this construction, as if desired, the windlass 27 may be provided with only one winding drum if considered necessary.

The drive shaft 31 of the windlass extends outwardly but not through the side of the vehicle body and is provided with a removable crank 32 so as to permit winding of the drums 30. When the flexible member 28 is wound about the drums 30 the upper end of the loader 11 is drawn inwardly of the vehicle and in like manner the supporting legs 23 will swing the lower end of the frame 11 upwardly.

In order to properly support the upper end of the frame 11 within the vehicle there are provided a pair of forwardly extending legs 33 which are secured to the frame 11 adjacent the upper end thereof and brace members 34 are secured at one end to the upright members 12 and at the opposite end to the supporting legs 33, so as to securely hold the legs 33 in adjusted position.

The supporting legs 23 are of sufficient length as to hold the upper end of the frame 11 away from the body of the vehicle 10 so that the body of the vehicle will not be injured thereby.

A pair of securing flexible members 35 are secured at one end to eye bolts 36 carried by the upper horizontal bar 13 adjacent the opposite ends thereof, and extending outwardly of the front face, the flexible members 35 being provided at one end thereof with a securing hook 37 which is adapted to engage in an eye bolt 38 secured to the running board 39 of the vehicle 10.

It, of course, will be understood that I do not wish to be limited to the position of the eye bolt 38 as this bolt may be positioned on any other desired part of the vehicle depending only upon the character of the vehicle used.

A spring or resilient member 40 is interposed between the ends of the flexible member 35 so that when the flexible member 35 is in adjusted position the frame 11 will be permitted to have slight movement depending only upon the tension placed on the spring 40, so that when the vehicle travels over a relatively rough road the spring will serve in the capacity of a cushion so as to permit the frame 11 with the article 18 positioned thereon to have relatively independent movement with respect to the vehicle 10.

In the operation of this device the loader 11 is preferably positioned in substantially vertical position when it is desired to mount a box or article 18 thereon, the forward lower edge of the box 18 being positioned on the rearwardly extending feet 17.

The strap members 21 may then be positioned about the outer surface of the article 18 so as to securely hold the article on the loader 11.

When the article 18 has been securely fastened to the loader 11 the windlass 27 may be operated so as to draw the flexible member 28 inwardly and coactively draw the upper end of the loader 11 into an inclined position, such as that shown in dotted lines in Figure 1 of the drawings.

It will, of course, be understood that when the loader 11 is in vertical position and prior to the drawing of the upper end inwardly of the vehicle, the supporting feet or legs 23 are mounted on the transverse bar 26 of the vehicle so that the transverse bar 26 serves in the capactiy of a fulcrum, and when the upper end of the loader 11 is drawn forwardly and downwardly, the lower end of the loader 11 is drawn upwardly.

The loader 11 is drawn downwardly to the point where the supporting legs 33 engage the floor of the vehicle 10 at the rear portion thereof. In order to prevent the loader 11 with the article 18 from swinging rearwardly, the securing members 37 are fastened in the eye bolts 38 carried by the vehicle.

It is, of course, understood that various changes and modifications may be made in the details of construction and design of the above specifically described embodiment of the invention without departing from the spirit thereof, such changes and modifications being restricted only by the scope of the following claims.

What I claim is:—

1. An article carrier of the character described including a frame adapted to be detachably positioned on a vehicle, said frame comprising a pair of vertically disposed members, a plurality of horizontally disposed bars secured to said vertical members, a plurality of forwardly extending and downwardly inclined legs secured to said vertical members, a flexible member secured to each side of the frame adjacent the upper end thereof, means for securing said flexible members to the vehicle, and resilient means interposed in said flexible means whereby to permit the frame to have relative movement on the vehicle.

2. An attachment for vehicles comprising an article carrier of the character described including a frame, a pair of inclined supporting members secured to the frame intermediate the ends thereof and adapted for rockable engagement with the vehicle, a pair of supporting legs carried by the frame adjacent the upper end thereof and engaging a portion of the vehicle upon inward swinging of the frame for holding the frame in inclined position on the vehicle, means mounted in the vehicle and engaging the frame whereby to draw the frame inwardly of the vehicle, and flexible means secured to the frame and detachably engaging the vehicle whereby to hold the frame in adjusted position on the vehicle.

In testimony whereof I hereunto affix my signature.

SHERMAN L. CAPLE.